(12) United States Patent
Altemark

(10) Patent No.: US 8,433,541 B2
(45) Date of Patent: Apr. 30, 2013

(54) METHOD AND SYSTEM FOR MONITORING A WIND ENERGY INSTALLATION

(75) Inventor: Jens Altemark, Rendsburg (DE)

(73) Assignee: REpower Systems AG, Hamburg (DE)

( * ) Notice: Subject to any disclaimer, the term of this patent is extended or adjusted under 35 U.S.C. 154(b) by 552 days.

(21) Appl. No.: 12/686,049

(22) Filed: Jan. 12, 2010

(65) Prior Publication Data

US 2010/0179773 A1 Jul. 15, 2010

(30) Foreign Application Priority Data

Jan. 12, 2009 (DE) .......................... 10 2009 004 385

(51) Int. Cl.
*G06F 11/30* (2006.01)

(52) U.S. Cl.
USPC ........................................................ 702/184

(58) Field of Classification Search .................... 702/184
See application file for complete search history.

(56) References Cited

U.S. PATENT DOCUMENTS

| | | | | |
|---|---|---|---|---|
| 7,285,870 | B2 * | 10/2007 | Schubert .......................... | 290/44 |
| 8,108,155 | B2 * | 1/2012 | Sandvad et al. ................. | 702/33 |
| 2004/0230377 | A1 | 11/2004 | Ghosh et al. | |
| 2006/0245369 | A1 | 11/2006 | Schimmelpfeng et al. | |
| 2010/0183440 | A1 * | 7/2010 | Von Mutius et al. .............. | 416/1 |

FOREIGN PATENT DOCUMENTS

| | | |
|---|---|---|
| DE | 199 48 194 | 4/2001 |
| DE | 101 54 482 | 5/2003 |
| DE | 10 2006 018 232 | 11/2006 |
| DE | 10 2005 053 185 | 5/2007 |
| DE | 10 2007 027 849 | 12/2008 |
| EP | 1 531 376 | 5/2005 |
| EP | 1 783 365 | 5/2007 |
| WO | WO-02/079646 | 10/2002 |
| WO | WO-03/040843 | 5/2003 |

OTHER PUBLICATIONS

Caselitz, P. et al. (1999). "Condition monitoring in wind energy converters" (English Abstract); 191 pages.
Hau, E. (2003). *Wind Turbines: fundamentals, technologies, application, economics*. Springer, pp. 669-675, 730-732. (Review of English Equivalent on Google books).
Windblatt Enercon Magazine for wind energy, Issue 2. (2007). (English Abstract); 19 pages.
Reliawind Objectives, Nov. 2008; 12 pages.
Enercon wind energy converters: Technology & Service. (2010). (English Abstract); 65 pages.

* cited by examiner

*Primary Examiner* — Aditya Bhat
(74) *Attorney, Agent, or Firm* — Morrison & Foerster LLP

(57) ABSTRACT

A method and system for monitoring the operation of a wind energy installation. State data relating to the wind energy installation is recorded and discrepancies are found between the state data and an associated comparison value. A failure probability of the wind energy installation is determined based on any found discrepancy. An availability value for the wind energy installation is determined from the ratio of the actually produced amount of electrical energy to the total amount of energy which can potentially be produced. The availability value and the failure probability are then combined to form a repair priority, which is associated with the wind energy installation. Accordingly, more uniform operation of wind energy installations can be achieved.

11 Claims, 1 Drawing Sheet

METHOD AND SYSTEM FOR MONITORING A WIND ENERGY INSTALLATION

REFERENCE TO RELATED APPLICATIONS

This application claims the priority of German Patent Application No. 10 2009 004 385.3, filed Jan. 12, 2009, the contents of which are incorporated herein by reference.

FIELD OF THE INVENTION

The invention relates to a method for monitoring the operation of a wind energy installation. In the method, state data relating to the wind energy installation is recorded, and discrepancies are found between the state data and an associated comparison value. The invention also relates to an arrangement for carrying out the method according to the invention. The arrangement comprises a wind energy installation, a monitoring centre, a computation module, a logic module and a calculator. The wind energy installation has a sensor which is designed to record state data relating to the wind energy installation. The logic module determines discrepancies between the state data relating to the wind energy installation and an associated comparison value.

BACKGROUND OF THE INVENTION

Until now, monitoring has been carried out in each individual wind energy installation to determine whether this installation is operating correctly, that is to say whether all the state data is in the specified range. If a discrepancy from correct operation is found, then a defect message is produced, and is sent to a monitoring centre. The defect messages are analysed in the monitoring centre, and the repair measures to be carried out on the relevant wind energy installation are defined. The defect messages are processed in the time sequence of their arrival.

Particularly in the case of large offshore windfarms, this processing of defect messages leads to undesirable effects. As is known, wind energy installations must be subjected to regular servicing after a predetermined operating time. In the case of offshore windfarms, the regular servicing is associated with considerable effort, because the servicing personnel and the tools required must be taken to the wind energy installations by boat. It is therefore financially worthwhile to carry out the servicing on as many wind energy installations as possible at the same time. Even if, as is normal practice in the case of offshore windfarms, all the wind energy installations were commissioned at the same time, the servicing is not necessarily due at the same time. This is because the time for servicing is not primarily governed by a specific time period having passed but by a specific amount of electrical energy having been produced. In particular because of failure times of different duration or wind conditions, the electrical energy produced by a specific time may vary to a major extent from one wind energy installation to another. This can lead to the regular servicing being due for one wind energy installation at a time when only 95% of the electrical energy for this servicing interval has been produced in another wind energy installation. If servicing is nevertheless also carried out at this time for this wind energy installation, a portion of the servicing interval is lost. If, in contrast, the servicing of this wind energy installation is carried out later, then it is no longer possible to expect that simultaneous servicing will be possible for the subsequent servicing interval. Against this background, it is desirable for the servicing of all the wind energy installations in the windfarm to coincide as far as possible in time.

SUMMARY OF THE INVENTION

The invention is based on the object of proposing a method and an arrangement for monitoring the operation of a wind energy installation which results in wind energy installations being operated as uniformly as possible. Against the background of the prior art mentioned initially, the object is achieved by the features broadly disclosed herein. Advantageous embodiments are specified in the detailed disclosure.

In the method according to the invention, a failure probability for the wind energy installation is determined on the basis of any discrepancy found between the state data and the associated comparison value. Furthermore, an availability value is determined from the ratio of the actually produced amount of electrical energy to the total amount of energy which can potentially be produced. The availability value and the failure probability are combined to form a repair priority, and the repair priority is associated with the wind energy installation.

First of all, a number of terms will be explained. The limit of the failure probability is 100%. This is the situation when the wind energy installation has already been automatically shut down because of the fault that has been found. If, in contrast, the wind energy installation is in operation and all the state data corresponds to the nominal values, then the failure probability has a low value of, for example, 0%. If there is discrepancy between the state data and the associated comparison value which does not lead to the wind energy installation being shut down immediately, then a failure probability value between 0% and 100% can be associated with the wind energy installation. If no values between 0% and 100% are provided for the failure probability, then the failure probability corresponds to a criterion relating to whether the wind energy installation is or is not ready to operate. In order to associate values between 0% and 100% with the failure probability, additional information and empirical values must be used. For example, it may be known from previous observations that a gearbox oil temperature rise of 10° C. leads to a probability of failure of the wind energy installation of 30% within three months and to a probability of failure of the wind energy installation of 50% within six months. In contrast, for example, a converter temperature rise of 10° C. may result only in a failure probability of 10% within the next six months. Corresponding data, which is required to determine the failure probability, is determined in condition monitoring systems, and is available to the manufacturers of wind energy installations.

The availability value relates to the history and indicates the ratio of the amount of electrical energy actually produced to the total amount of energy which can potentially be produced. The amount of electrical energy actually produced is known, since it forms the basis for the certificate which the operator of the wind energy installation receives. The value for the total amount of energy which can potentially be produced is likewise known, because information relating to the wind conditions is recorded continuously in the wind energy installation, and because it is possible to use the power curve for the wind energy installation to calculate how much electrical energy the wind energy installation would have to produce at which windspeeds if it were to be operational without interruption. In many cases, the availability value is also calculated in any case as a ratio of the two values, because the availability value can also form a basis for contractual negotiations between the manufacturer and the operator of the wind energy installation.

The availability value and the failure probability are combined to form a repair priority, wherein the repair priority is higher the higher the failure probability is and the lower the availability in the past was, and vice versa. When all the recorded state data varies in the specified range, the failure probability and therefore the repair priority have a low value or the value 0. An increased failure probability occurs only when conspicuous values are found in the state data. The term repair also covers the provision of regular servicing. The repair priority may be output on a display or in a similar manner, and may be used as a criterion for the sequence in which the wind energy installations will be repaired. The value of the repair priority can therefore influence the sequence in which the wind energy installations are repaired.

Since, according to the invention, the availability value and the failure probability are combined to form a repair priority, this achieves progress with regard to uniform operation of the wind energy installations. Whereas, until now, the wind energy installations have been repaired in the sequence in which the defect messages occurred, the repair priority now additionally takes account of the previous availability of the relevant wind energy installation. By way of example, a wind energy installation which has an availability close to 100% will be repaired later in some circumstances, despite the earlier occurrence of a fault, than an adjacent wind energy installation whose previous availability was only 94%. The invention therefore promotes more uniform operation of the wind energy installations. Those values which are available in any case or can easily be determined on the basis of existing data are used exclusively for determining the repair priority with the availability value and the failure probability. As explained above, the invention can be used for an offshore windfarm to ensure that the regular servicing is due at the same time on as many wind energy installations as possible. It is not a precondition that all the wind energy installations with which a repair priority is associated for the purposes of the method according to the invention must belong to the same windfarm. The idea of the invention is not restricted to offshore windfarms, but can easily be applied to on-shore wind energy installations.

The comparison value which is used as the basis for determining whether the recorded state data corresponds to correct operation is in the simplest case a previously defined limit value which must not be exceeded during operation of the wind energy installation. By way of example, a comparison value of 120° C. may be preset for the gearbox oil temperature, above which the wind energy installation must be shut down. However, greater benefit can be obtained from the method according to the invention if an average value over a multiplicity of wind energy installations is used as a comparison value, in addition or instead of this. If, for example, the gearbox oil temperature is between 75° C. and 85° C. for 40 wind energy installations of the same type after they have been operated at the rated power for two hours, while a gearbox oil temperature of 95° C. is reached in a further wind energy installation in the same conditions, then, although the latter wind energy installation has not yet reached the limit value of 120° C., it can, however, be expected that the limit value will be exceeded earlier than in the case of the other wind energy installations. For this reason, a higher failure probability is associated with that wind energy installation. In particular, the repeated occurrence of an intrinsically non-critical discrepancy between state data and comparison values may give cause to associate an increased failure probability with that wind energy installation.

The invention covers the state data relating to the wind energy installation being compared with generally defined comparison values, and with a message being sent to a monitoring centre only when a conspicuous value occurs. However, the capabilities to compare and to evaluate state data are better when the state data is transmitted to a monitoring centre. In particular, it is then possible to use the state data to obtain new comparison values which correspond to correct operation of the wind energy installation.

The yield of a wind energy installation is considerably higher when it is operated at a location where the mean windspeed is high. The loss is for this reason greater when a wind energy installation at a location where the mean windspeed is high fails than when a wind energy installation at a location where the mean windspeed is low fails, since the unused wind energy during a failure is potentially greater. For this reason, additional information relating to the local wind conditions can be included in the repair priority, with the tendency for a wind energy installation at a location where the mean windspeed is high to be repaired earlier than a wind energy installation at a location where the mean windspeed is low. In the same context, the repair priority can include information about the rated power of the wind energy installation, as a result of which a wind energy installation with a high rated power will be repaired before a wind energy installation with a low rated power.

The method according to the invention is advantageously used at the same time for a multiplicity of wind energy installations. If a repair priority is associated with each wind energy installation, a list can be created on the basis of the ranking, with the sequence of the list entries being used to define the sequence in which the wind energy installations will be repaired. The repair priorities and the list are continuously updated, in which case the sequence of the list entries may vary continually, when the repair priority of a wind energy installation changes. Comparison values which correspond to correct operation of the wind energy installation can be obtained in parallel from the state data. Furthermore, the comparison with other wind energy installations can easily be drawn for each wind energy installation on the basis of the comparison values. Information can be obtained, for example that only 5% of the wind energy installations of the same type have output more defect messages within the same operating period than the relevant wind energy installation. Information of this type can be used for evaluation in the form of a graph.

Wind energy installations are subject to particular wear when starting attempts are carried out excessively frequently. The aim of achieving more uniform operation of wind energy installations can for this reason be promoted by including in the repair priority information on the number of starting attempts to which the wind energy installation has previously been subjected. In this case, a large number of starting attempts leads to the repair priority being increased, and vice versa.

The value used for the method according to the invention is preferably also used when some of the wind energy installations in a windfarm must be shut down, for example because of faults in the electrical grid system to which the windfarm is connected. By way of example, wind energy installations with a high failure probability can thus be shut down first, and a wind energy installation with a low availability can be shut down last.

The invention furthermore relates to an arrangement as mentioned initially for carrying out the method according to the invention. According to the invention, the arrangement is distinguished in that the calculator determines an availability value related to the wind energy installation from the ratio of the actually produced amount of electrical energy and the total amount which can potentially be produced. The computation module determines a failure probability of the wind energy installation when the logic module finds a discrepancy. The computation module combines the availability value and the failure probability to form a repair priority. The repair priority is associated with the wind energy installation in the monitoring centre.

Here, the term computation module should be understood in a functional sense, and there is no need for the computation module to be a physical unit. Admittedly, in one advantageous embodiment, the computation module is arranged in the monitoring centre.

In other embodiments, at least a portion of the computation module can be separated from the monitoring centre and, for example, can be arranged in the wind energy installation. In one advantageous embodiment, the arrangement comprises a multiplicity of wind energy installations, with the multiplicity of wind energy installations being associated with one monitoring centre. The repair priorities relating to the wind energy installations are preferably sorted in the monitoring centre on the basis of a ranking, thus resulting in a sequence in which the wind energy installations will be repaired. The computation unit can also be designed to use state data relating to a multiplicity of wind energy installations in order to determine comparison values which correspond to correct operation.

BRIEF DESCRIPTION OF THE DRAWINGS

The invention will be described in the following text by way of example using one advantageous embodiment and with reference to the attached drawings, in which.

DETAILED DESCRIPTION OF THE INVENTION

Figure 1:
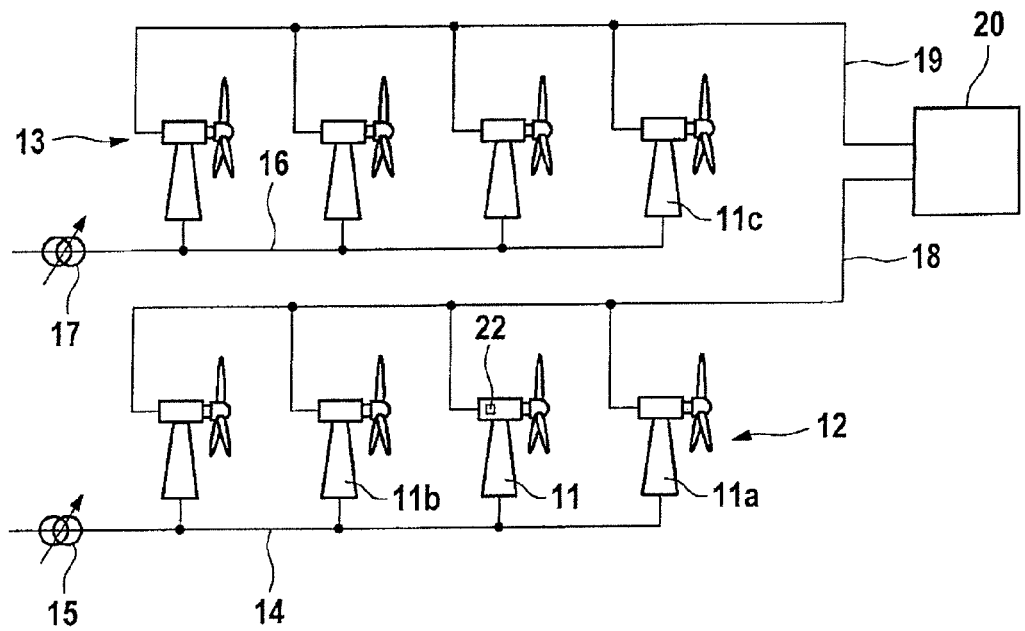
FIG. 1 shows a schematic illustration of an arrangement according to the invention.

An arrangement according to the invention in FIG. 1 comprises a plurality of wind energy installations 11, 11a, 11b, 11c which are combined to form a first windfarm 12 and a second windfarm 13. The electrical energy produced in the windfarm 12 is passed via a network 14 within the windfarm to a substation 15 where the electrical energy is transformed to high voltage and is transmitted to the public power distribution grid system. In the windfarm 13, the electrical energy is passed to a substation 17 in a corresponding manner via a network 16 within the windfarm. The wind energy installations 11, 11a, 11b, 11c in the two windfarms 12, 13 are connected to a monitoring centre 20 via data lines 18, 19.

Each wind energy installation has a controller, as is indicated by the reference number 22 for the wind energy installation 11. The controller 22 is connected to a wind sensor 23 and to a meter 24 for the amount of electrical energy fed in. The values measured by the wind sensor 23 and the meter 24 are supplied to a calculator 25 which first of all uses the values from the wind sensor 23 to determine the total amount which can potentially be produced, that is to say the amount of electrical energy which the wind energy installation 11 would have been able to produce without any down times. The calculator 25 calculates an availability value for the wind energy installation 11, which results as the quotient of the amount of energy actually fed in and the total amount which can potentially be produced.

Figure 2:
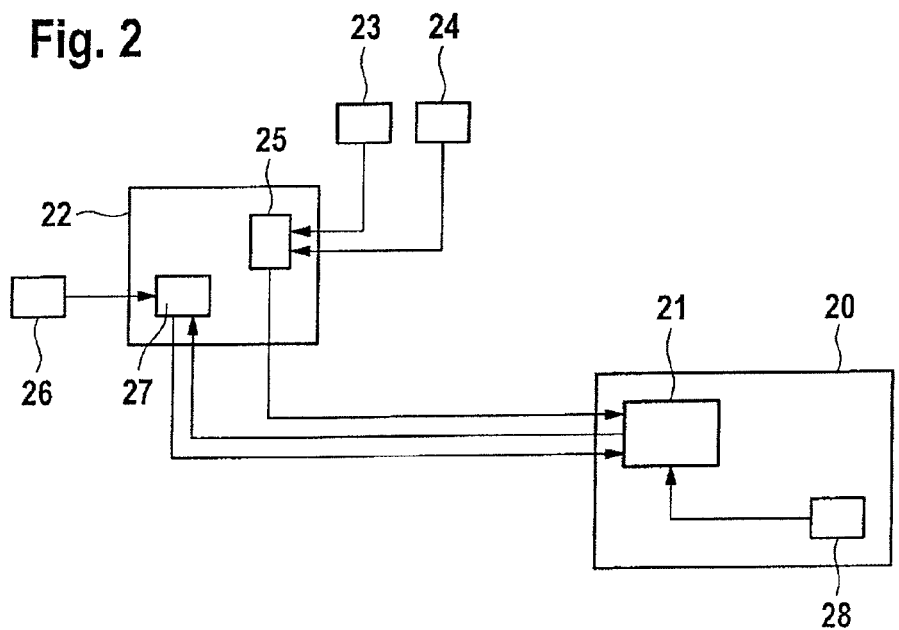
FIG. 2 shows a schematic illustration of elements of the arrangement according to the invention.

The controller 22 for the wind energy installation 11 is also connected to a plurality of sensors, which record state data during operation of the wind energy installation 11. By way of example, FIG. 2 shows a sensor 26 which measures the temperature of the gearbox oil in the wind energy installation 11. The state data recorded by the sensor 26 is supplied to a logic module 27 which determines whether there are any discrepancies between the state data and the associated comparison values. The state data is first of all compared with an absolute limit value in the logic module 27. If the state data exceeds an absolute limit value, then the wind energy installation 11 must be shut down. In addition, the logic module 27 compares the state data with an average value, which reflects the average state of wind energy installations of this type in a corresponding operating state. The average values are transmitted from the monitoring centre 20 to the logic module 27.

If the logic module 27 finds a discrepancy between the state data and the associated comparison values, then an appropriate message is transmitted to a computation module 21 in the monitoring centre 20. On the basis of the discrepancy between the state data relating to the wind energy installation 11 and the average value, the computation module 21 determines a failure probability for the wind energy installation 11. The computation module 21 makes use of additional data from a memory 28 in the monitoring unit 20 for this purpose. The data, which is based on previous observations, can be used to determine the probability with which a discrepancy between the state data relating to the wind energy installation and the average value will lead to a failure of the wind energy installation. The computation module 21 uses the data from the memory 28 in order to determine a failure probability for the wind energy installation 11.

The computation module 21 then combines the failure probability and the availability value, which is transmitted from the calculator 25 to the computation module 21, and determines a repair priority for the wind energy installation 11. The determination of the repair priority is illustrated in the following text with reference to simple examples. The repair priorities of all the wind energy installations involved in the method are sorted on the basis of a ranking, thus resulting in a sequence in which the wind energy installations are to be repaired.

State data is recorded for three wind energy installations WEI 1, WEI 2, WEI 3 of the same type. The state data relates to the temperature of the gearbox oil, the temperature of the converter, the temperature of the generator and the temperature of the main bearing. A sensor is provided for each of these variables in each wind energy installation, resulting in the following state data:

|  | State data | | | Comparison values |
| --- | --- | --- | --- | --- |
|  | WEI 1 | WEI 2 | WEI 3 | (limit value) |
| Gearbox oil temperature | 70° C. | 72° C. | 75° C. | 120° C. |
| Converter temperature | 40° C. | 45° C. | X | 60° C. |
| Generator temperature | 64° C. | 60° C. | 61° C. | 85° C. |
| Main bearing temperature | X | 65° C. | 65° C. | 95° C. |

An absolute limit value, which must not be exceeded, is used as a comparison value for the state data. The indication "X" for the temperature of the main bearing of WEI 1 and the temperature of the converter in WEI 3 indicates that the limit value has been exceeded, and that the wind energy installation has had to be shut down for this reason. The details for WEI 1 and WEI 3 in the other rows are the relevant values shortly before the wind energy installations were shut down. WEI 1 and WEI 3 have already been shut down, and therefore have a failure probability of 100%. All the values recorded as state data for WEI 2 are considerably below the associated limit values, and the failure probability is 0%. No further distinction is drawn with regard to the failure probability between 0% and 100% in this example.

In addition, each wind energy installation has a logic module which determines a relative availability, which is reflected in an availability value, from the ratio of the amount of electrical energy actually produced to the total amount which can potentially be produced. The following table shows the corresponding values:

|  | Wind energy installation 1 | WEI 2 | WEI 3 |
|---|---|---|---|
| Failure probability | 100% | 0% | 100% |
| Availability value | 99% | 97% | 92% |
| Repair priority | 1.01 | 0 | 1.09 |

The availability values and failure probabilities determined in the wind energy installations are transmitted to the monitoring centre. A repair priority is calculated for each wind energy installation in the monitoring centre by forming the quotient of the failure probability and the availability value. WEI 1 has a repair priority of 1.01, WEI 2 a repair priority of 0, and WEI 3 a repair priority of 1.09. Since both WEI 1 and WEI 3 have a failure probability of 100%, the repair priority in this case depends solely on the availability value. It is possible to derive from the higher repair priority that WEI 3 must be repaired before WEI 1. Since no indication of damage is evident for WEI 2, the repair priority has the value 0, since no repairs are required.

In the following example, the state data is compared with average values, in addition to the absolute limit values. The average values are obtained from measurements and observations which have previously been carried out on wind energy installations of this type. The values in the right-hand column indicate the values which were measured during continuous operation at the rated power. Alternatively, average values for other operating states of the wind energy installations may be indicated there, and all that is necessary is to ensure that the state data relating to the wind energy installations matches the comparison values.

|  | State data | | | Comparison values |
|---|---|---|---|---|
|  | WEI 1 | WEI 2 | WEI 3 | Average |
| Gearbox oil temperature | 70° C. | 71° C. | 92° C. | 70° C. |
| Converter temperature | 40° C. | 45° C. | 42° C. | 41° C. |
| Generator temperature | 64° C. | 60° C. | 61° C. | 65° C. |
| Main bearing temperature | X | 65° C. | 65° C. | 65° C. |
| Availability value | 99% | 97% | 92% |  |

As in the above example, WEI 1 has already been shut down because the absolute limit value for the temperature of the main bearing has been exceeded. WEI 2 and WEI 3 are being operated, and there are no conspicuous features in comparison to the average value in the state data for WEI 2. In contrast, a gearbox oil temperature of 92° C. was measured for WEI 3, even though wind energy installations of this type on average have a gearbox oil temperature of only 70° C. in a corresponding operating state. A gearbox oil temperature of 92° C. does not yet exceed any absolute limit, and WEI 3 can therefore remain in operation. However, the increased gearbox oil temperature indicates a fault which may lead to failure of the wind energy installation within a foreseeable time. For this reason, on the basis of previous observations, WEI 3 is allocated a value for the failure probability. In this example, the failure probability is 70%:

|  | Wind energy installation 1 | WEI 2 | WEI 3 |
|---|---|---|---|
| Failure probability | 100% | 0% | 70% |
| Availability value | 98% | 97% | 92% |
| Repair priority | 1.02 | 0 | 0.76 |

A repair priority is once again determined in the monitoring centre from the failure probability and the availability value. If the repair priority is calculated as the quotient of the failure probability and the availability value, then this results in a repair priority of 1.01 for WEI 1, and a repair priority of 0.76 for WEI 3. WEI 1 is therefore repaired before WEI 3.

With this type of calculation of the repair priority, those wind energy installations which have a failure probability of 100%, that is to say those which have already failed, are generally repaired first of all. In some cases, it is desirable to give a greater weighting to the availability value than to the failure probability. This can be achieved, for example, by associating a factor with the repair priority. For example, if one were to associate the factor 1 with an availability value between 100% and 98%, the factor 2 with an availability value between 97% and 95%, and the factor 3 with an availability value between 94% and 92%, then this would lead to the following results when the repair priority is calculated as a product of the failure probability and the factor:

|  | WEI 1 | WEI 2 | WEI 3 |
|---|---|---|---|
| Failure probability | 100% | 0% | 70% |
| Availability value | 98% | 97% | 92% |
| Repair priority | 200 | 0 | 210 |

Therefore, with this type of calculation, WEI 3 would be repaired before WEI 1. This means that the availability value of WEI 3 is similar to the availability value of WEI 1, and that the wind energy installations are operated more uniformly overall.

The invention claimed is:
1. A method for monitoring the operation of a wind energy installation, implemented using a controller, comprising:
  recording state data relating to the wind energy installation;
  finding discrepancies between the state data and an associated comparison value;
  determining a failure probability of the wind energy installation on the basis of any discrepancy found;
  determining an availability value for the wind energy installation from the ratio of an actually produced amount of electrical energy to a total amount of energy which can potentially be produced;
  combining the availability value and the failure probability to form a repair priority; and associating the repair priority with the wind energy installation.

2. The method of claim 1, wherein the comparison value is an average value over a plurality of wind energy installations.

3. The method of claim 1, wherein the state data of the wind energy installation is transmitted to a monitoring center.

4. The method of claim 1, further comprising including information relating to the local wind pattern in the repair priority.

5. The method of claim 1, further comprising monitoring the operation of a plurality of wind energy installations.

6. The method of claim 5, further comprising obtaining comparison values which correspond to correct operation of the wind energy installation from state data recorded for the plurality of wind energy installations.

7. A wind energy system comprising:
a wind energy installation having a sensor configured to record state data of the wind energy installation;
a logic module configured to determine discrepancies between the state data and an associated comparison value;
a calculator configured to determine an availability value related to the wind energy installation from the ratio of an actually produced amount of electrical energy and a total amount of energy which can potentially be produced;
a computation module configured to (i) determine a failure probability of the wind energy installation when the logic module finds a discrepancy and (ii) combine the availability value and the failure probability to form a repair priority; and
a monitoring center configured to associate the repair priority with the wind energy installation,
wherein the system is configured to carry out the method according to one of claims 1 to 6.

8. A wind energy system comprising:
a wind energy installation having a sensor configured to record state data of the wind energy installation;
a logic module configured to determine discrepancies between the state data and an associated comparison value;
a calculator configured to determine an availability value related to the wind energy installation from the ratio of an actually produced amount of electrical energy and a total amount of energy which can potentially be produced;
a computation module configured to (i) determine a failure probability of the wind energy installation when the logic module finds a discrepancy and (ii) combine the availability value and the failure probability to form a repair priority; and
a monitoring center configured to associate the repair priority with the wind energy installation.

9. The system of claim 8, further comprising a plurality of wind energy installations, wherein the monitoring center is further configured to sort repair priorities of the plurality of wind energy installations based on a ranking.

10. The system of claim 8, wherein the computation unit is arranged in the monitoring center.

11. The system of claim 8, wherein the computation unit is further configured to use state data for a plurality of wind energy installations to determine comparison values that correspond to correct operation.

* * * * *